(12) United States Patent
Debelak et al.

(10) Patent No.: US 9,982,621 B2
(45) Date of Patent: May 29, 2018

(54) METHOD FOR OPERATING AN INTERNAL COMBUSTION ENGINE, INTERNAL COMBUSTION ENGINE AND MAINTENANCE SYSTEM FOR AN INTERNAL COMBUSTION ENGINE, SELF-EXECUTABLE COMPUTER PROGRAM PRODUCT AND NON-VOLATILE STORAGE MEDIUM

(71) Applicant: MTU Friedrichshafen GmbH, Friedrichshafen (DE)

(72) Inventors: Albrecht Debelak, Friedrichshafen (DE); Andreas Schneider, Meckenbeuren (DE); Michael Wölki, Immenstaad (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 681 days.

(21) Appl. No.: 14/396,345

(22) PCT Filed: Apr. 15, 2013

(86) PCT No.: PCT/EP2013/001109
§ 371 (c)(1),
(2) Date: Oct. 22, 2014

(87) PCT Pub. No.: WO2013/159874
PCT Pub. Date: Oct. 31, 2013

(65) Prior Publication Data
US 2015/0081194 A1    Mar. 19, 2015

(30) Foreign Application Priority Data

Apr. 24, 2012   (DE) ......................... 10 2012 206 745

(51) Int. Cl.
*F02D 41/26* (2006.01)
*F02D 41/24* (2006.01)

(52) U.S. Cl.
CPC ............. *F02D 41/26* (2013.01); *F02D 41/24* (2013.01); *F02D 41/2432* (2013.01); *F02D 41/2487* (2013.01); *G06F 8/654* (2018.02)

(58) Field of Classification Search
None
See application file for complete search history.

(56) References Cited

U.S. PATENT DOCUMENTS 5,426,585 A * 6/1995 Stepper ............... F02D 41/2425
701/101
6,434,455 B1 * 8/2002 Snow .................. G06F 11/2294
701/31.4

(Continued)

FOREIGN PATENT DOCUMENTS

DE      10348209 A1   5/2005
DE      10352033 A1   6/2005

(Continued)

*Primary Examiner* — Jonathan M Dager
(74) *Attorney, Agent, or Firm* — Lucas & Mercanti, LLP; Klaus P. Stoffel (57) ABSTRACT

A method for operating an internal combustion engine having a hardware structure including an engine control unit and a maintenance unit, an electronic engine identification module and an engine control program, the method having the steps: providing a computer program product via a network by which an engine identification and engine data are loaded together and are exchanged, wherein the computer program product is designed for uploading and/or downloading a maintenance software module by which the engine identification and the engine data are compiled; loading the computer program product onto a non-volatile storage medium; coupling the non-volatile storage medium to the maintenance unit of the hardware structure and (Continued)

executing the computer program product; exchanging the maintenance software module between the non-volatile storage medium and the maintenance unit; identifying the engine and compiling engine data by the maintenance software module and a hardware component of the hardware structure.

9 Claims, 2 Drawing Sheets

(56) References Cited

U.S. PATENT DOCUMENTS

| | | | | |
|---|---|---|---|---|
| 6,571,191 | B1* | 5/2003 | York | F02D 41/2422 |
| | | | | 702/104 |
| 6,735,514 | B2* | 5/2004 | Pepi | F02D 41/2422 |
| | | | | 123/406.33 |
| 6,898,489 | B1* | 5/2005 | Hayes, Sr. | G06K 17/00 |
| | | | | 340/5.2 |
| 7,006,914 | B1* | 2/2006 | Cahoon | B60R 25/04 |
| | | | | 701/115 |
| 7,047,128 | B2* | 5/2006 | Dudel | B60R 25/04 |
| | | | | 700/90 |
| 7,145,485 | B2* | 12/2006 | Mizusawa | B60R 25/04 |
| | | | | 341/87 |
| 7,319,925 | B2* | 1/2008 | Gisy | B60W 50/00 |
| | | | | 701/32.8 |
| 7,363,129 | B1* | 4/2008 | Barnicle | G08C 17/02 |
| | | | | 701/1 |
| 8,036,819 | B2* | 10/2011 | Bleil | F02D 41/2435 |
| | | | | 701/102 |
| 8,688,313 | B2* | 4/2014 | Margol | G06F 8/61 |
| | | | | 701/31.4 |
| 9,457,740 | B2* | 10/2016 | Odate | H04L 67/125 |
| 9,730,254 | B2* | 8/2017 | O'Meara | H04W 76/02 |
| 2002/0133273 | A1* | 9/2002 | Lowrey | G01M 15/04 |
| | | | | 701/29.4 |
| 2003/0223473 | A1* | 12/2003 | Unger | F01P 11/00 |
| | | | | 374/141 |
| 2005/0253726 | A1* | 11/2005 | Yoshida | B60R 25/04 |
| | | | | 340/572.8 |
| 2006/0041337 | A1* | 2/2006 | Augsburger | F02D 41/2487 |
| | | | | 701/1 |
| 2006/0090077 | A1* | 4/2006 | Little | G06F 21/10 |
| | | | | 713/184 |
| 2007/0018830 | A1* | 1/2007 | Inoue | B60R 25/00 |
| | | | | 340/572.4 |
| 2012/0283938 | A1* | 11/2012 | Debelak | F02D 41/24 |
| | | | | 701/115 |

FOREIGN PATENT DOCUMENTS

| | | |
|---|---|---|
| DE | 102005038462 A1 | 2/2007 |
| DE | 102006026816 A1 | 12/2007 |
| DE | 102010005499 A1 | 7/2011 |
| DE | 102010015132 A1 | 10/2011 |
| EP | 0511737 A2 | 11/1992 |
| EP | 1089179 A1 | 4/2001 |
| EP | 1826386 A1 | 8/2007 |
| WO | 03021192 A1 | 3/2003 |

* cited by examiner

METHOD FOR OPERATING AN INTERNAL COMBUSTION ENGINE, INTERNAL COMBUSTION ENGINE AND MAINTENANCE SYSTEM FOR AN INTERNAL COMBUSTION ENGINE, SELF-EXECUTABLE COMPUTER PROGRAM PRODUCT AND NON-VOLATILE STORAGE MEDIUM

The present application is a 371 of International application PCT/EP2013/001109, filed Apr. 15, 2013, which claims priority of DE 10 2012 206 745.0, filed Apr. 24, 2012, the priority of these applications is hereby claimed and these applications are incorporated herein by reference.

BACKGROUND OF THE INVENTION

The invention relates to a method for operating, in particular for maintaining, an internal combustion engine having an engine and having a hardware structure comprising an engine control unit, a maintenance unit and an electronic engine identification module and having an engine control program, in particular having firmware and a functional engine application. The invention also relates to such an internal combustion engine a maintenance system for such an internal combustion engine. The invention also relates to a self-executable computer program product which can be executed under the engine control program. The invention also relates to a non-volatile storage medium having the computer program product which can be self-executed in conjunction with a hardware component of the maintenance system.

Correct functioning, in accordance with current specifications, of an internal combustion engine which is mentioned at the beginning is dependent to a considerable degree on faultless sequencing of a strictly updated open-loop and closed-loop control process of the internal combustion engine, which sequencing takes into account the operating states of the internal combustion engine. Open-loop and closed-loop control of the internal combustion engine is usually performed in its essential functions centrally by the engine control unit, also referred to as ECU or ADEC. The engine control unit can comprise a number of modules which are connected thereto such as, for example, a transmission control module or a turbo charger control module; modules for controlling exhaust gas post-treatment or similar control modules for a periphery of the engine of an internal combustion engine can also be provided; this can also include control modules which are provided for making an engine-generator coupling efficient.

The precondition for a control structure which functions in a way which is configured to the engine is a hardware structure which operates an engine control program for the engine which is configured for the operating state and state of ageing. For this reason, on the one hand it is necessary to prevent that a modified or even incorrect engine control program or associated software modules are unintentionally or incorrectly transferred to the hardware structure. On the other hand, it has additionally proven necessary also to maintain the engine control program regularly. This can comprise, for example, updating characteristic curves or adapting control programs with respect to an operating state or a state of ageing of an internal combustion engine or even interrogating current operating data or a history of operating data or data of an operating point. This relates, in particular, to internal combustion engines which are configured, in particular, for endurance such as large diesel engines for heavy utility vehicles, ship's drives or stand-alone power packs for recovering energy within the scope of an engine-generator connection.

It has become apparent that in order to detect an operating state or state of ageing of an internal combustion engine considerable specialist knowledge may be necessary in order to perform optimum definition for an engine control program or an update or the like for the engine control program or the associated modules and characteristic curves within the scope of what is appropriate and possible. Generally, it is usually necessary for specialist personnel to perform an exchange, in particular upload or download, of updated or significant engine data—i.e. all the data relating to an engine comprising also engine control programs and, in particular, the abovementioned data since faults are to be avoided in all cases, for example in the case of engine identification or software identification.

DE 103 52 033 A1 discloses a master-slave arrangement in which the interaction of the electronic components of a hardware structure is optimized in that the electronic engine control unit interrogates as a "master" the respective component, that is to say the "slave" with respect to its characteristic data which are relevant for operation. In this context, the characteristic data of the component are read out from the permanent memory of the component in the initialization phase and are transmitted to the electronic engine control unit. If necessary, the control parameters of the electronic engine control unit are then adapted. Safety measures to prevent an external intervention are not presented.

EP 1 826 386 A1 describes a master-slave arrangement for a diesel engine with a common rail system. In this arrangement, the electronic engine control unit corresponds to the "master". Inter alia, engine specifics are stored in a read only memory in the "slave". Engine specifics are the deviations of an engine from a standard engine, for example the injector-specific properties. In addition, identification data are stored in the read only memory of the "slave".

Protective measures against an external intervention are not presented.

In both cases of the abovementioned prior art, to a certain extent considerable expenditure has to be made in order, for example, to be able to perform reprogramming of an engine control unit or the like for operation or within the scope of maintenance.

It is desirable to improve operation, in particular maintenance, of an internal combustion engine, in particular in terms of an update of an engine control program or modules or characteristic curves associated therewith or to update engine specifics such as engine characteristic data or characteristic data of peripheral units which are connected to the engine.

SUMMARY OF THE INVENTION

This is where the invention comes in, the object of which is to specify a method for operating, in particular for maintaining, an internal combustion engine and a device in which the maintenance is simplified; in particular it is to be possible to reliably avoid faults. It is also to be advantageously possible for the method and the device to be used by personnel which have restricted specialist training, i.e. training which is limited to carrying out the maintenance measure. In particular, the method and the device are to be simplified with respect to the execution of maintenance.

The object relating to the method is achieved by a method that in particular, the steps:

providing a computer program product via a network by means of which an engine identification and engine data can be loaded together and exchanged, wherein the computer program product is designed to exchange, in particular upload and/or download, a maintenance software module by means of which the engine identification and the engine data can be compiled;

transferring the computer program product to a non-volatile storage medium;

coupling the non-volatile storage medium to the maintenance unit of the hardware structure and executing the computer program product by exchanging the maintenance software module between the non-volatile storage medium and the maintenance unit;

identifying the engine and compiling engine data by means of the maintenance software module and a hardware component of the hardware structure.

The method for achieving the object relating to the device leads to an internal combustion engine in which the maintenance unit has an interface slot for a non-volatile storage medium, for coupling the non-volatile storage medium to the maintenance unit of the hardware structure, and wherein the maintenance unit is designed to execute the computer program product which is designed to exchange, in particular upload and/or download, a maintenance software module by exchanging the maintenance software module between the non-volatile storage medium and the maintenance unit, and wherein the hardware structure is designed to identify the engine and compile engine data by means of the maintenance software module and a hardware component of the hardware structure.

With respect to the object relating to the device, the invention also leads to a maintenance system. According to the invention, the maintenance system has:

a network for providing a self-executable computer program product by means of which an engine identification and engine data can be loaded together and exchanged, which network is designed to exchange a maintenance software module by means of which the engine identification and the engine data can be compiled;

a non-volatile storage medium which is designed to transfer the self-executable computer program product, wherein the maintenance unit is designed:

to couple the non-volatile storage medium to the maintenance unit and execute the computer program product by exchanging the maintenance software module between the non-volatile storage medium and the maintenance unit, and wherein identification of the engine and compilation of engine data are made possible by means of the maintenance software module (60) and a hardware component of the hardware structure.

The invention also leads to a self-executable computer program product having a maintenance software module. The invention also leads to a non-volatile storage medium having a computer program product which can be self-executed in conjunction with a hardware component of the maintenance system and which is in turn designed to execute the method according to the invention when the non-volatile storage medium is coupled to the hardware component.

Within the scope of a particularly preferred development of the concept of the invention there is provision that an engine identification takes place by means of ID data of a header of the maintenance software module, and a container structure of the maintenance software module is designed to be loaded with engine data, wherein during the uploading the container structure are filled with engine data, and during the downloading engine data are extracted from the container structure. In particular, the computer program product can be embodied as a self-executable computer program product, wherein the execution of the computer program product takes place automatically in a self-starting fashion, and wherein the maintenance software module contains an execution program module which is designed to execute an engine identification by means of ID data of a header of the maintenance software module and is designed to load a container structure of the maintenance software module with engine data.

A container structure is to be understood as being a data structure which is suitable, when filled with a data content, for storing, in particular during downloading, the data content of the non-volatile storage medium in the hardware structure, in particular a hardware component thereof such as an engine control unit and/or the maintenance unit or a hardware module connected thereto. The container structure is also designed in the form of a data structure which can be filled with engine data, for example during uploading from an initially unfilled state, which engine data are extracted, for example, from the engine control unit or a hardware module connected thereto.

The invention is based on the idea that a significant difficulty with previous maintenance processes is to detect, as a function of the situation, an engine version or a version of an engine control unit or of an engine control program precisely, reliably and promptly; the specialist personnel who carry out the maintenance therefore have to perform an extremely complex task, which requires considerable training. Consequently, all the aspects of the internal combustion engine have to be available to the maintenance personnel, even if the matter concerns the clarification of possibly surprisingly occurring detailed questions after a long operating period. On the other hand, the invention is based on the idea that basically all the information for software maintenance of the internal combustion engine is available at the internal combustion engine itself, in particular in a hardware structure thereof, for example in an engine control unit.

The invention has recognized that it should be possible to make this information available to the maintenance personnel in an unambiguous way. The invention has recognized that this should be possible by means of a maintenance software module. A detection process for the maintenance software module can be reconciled in a suitable way by a computer program product with the internal combustion engine to be maintained. In particular, identification of the engine, of the hardware structure and of an engine control program can be possible. According to this concept, the invention has recognized that it should be possible for a computer program product which is provided with suitable detection sequences to perform software maintenance of the internal combustion engine automatically, specifically in such a way that the maintenance personnel merely initiates the process and monitors or registers the ending thereof. The detection of the internal combustion engine to be maintained can be performed in situ by means of the maintenance software module.

Accordingly, the invention develops a hardware structure of the engine control unit with a maintenance unit which is suitable for making available to the maintenance personnel in situ the information which is necessary for monitoring the software maintenance, as well as also providing suitable interfaces and display devices. Furthermore, the hardware structure is extended according to the invention with an electronic engine identification module which permits a software maintenance process to perform unambiguous identification of the engine and/or of the engine control unit and/or of the engine control programming which is present.

Overall, the concept of the invention provides the possibility of making available from specialist personnel, in particular to the manufacturer, suitable software updates externally and via a network and engine control programs which are necessary for maintenance as an update program or exchange program. The inputting into the internal combustion engine can then be performed by the user of the internal combustion engine by transferring the software to the non-volatile storage medium, coupling the latter to a maintenance unit and initiating execution of the maintenance software module. Highly trained specialist personnel at the location of the internal combustion engine are then therefore no longer absolutely necessary. Faults during the handling of the maintenance software are avoided through unambiguous identification of all the relevant components of the internal combustion engine.

In particular, the concept has the advantage that identification of all the relevant components of the internal combustion engine are available without falsification. For this purpose, the internal combustion engine is provided with a maintenance unit and an electronic engine identification module which is non-detachably firmly fastened to the engine.

Further advantageous developments of the invention can be found in the dependent claims which specify in particular further preferred possible ways of developing the concept of the invention with further advantages within the scope of the stated object.

Building on the hardware structure, one development has recognized that by providing a self-executable computer program product it is possible to initiate an upload and/or download process which independently exchanges engine data for the container structure, in particular with the container structure, between a non-volatile storage medium and a hardware component of the hardware structure. As a result, for example specific system data, operating data or the like can preferably be transferred into the container structure, within the scope of an upload, and secured out of the hardware structure in the non-volatile storage medium. This application has proven, in particular, necessary when replacing an engine or a pool motor. It is therefore possible, for example, to save previous system data within the scope of the upload and, if appropriate, then transfer it into a new internal combustion engine; the latter then occurring within the scope of a download.

Within the scope of a download it has proven advantageous to transfer engine data—which can generally also be referred to as system data—, in particular a container structure which is filled with engine data, from a non-volatile storage medium to the hardware structure. This application has proven useful, for example, when replacing a control unit, when engine or system-specific data and software data which have been saved from an old unit of an internal combustion engine are now transferred into a new unit of one of the same internal combustion engines or of another internal combustion engine.

The download is also suitable for diagnostics; specifically in that in the scope of an upload process previous system data are secured on a non-volatile storage medium in order then to be able to carry out external diagnostics thereof.

The precondition for the specified data exchange of engine data, i.e. an upload and/or download thereof, is correct identification of the engine, of the control unit and of the engine control program. This is ensured by means of an electronic engine identification module which contains, for example, further engine identification data, control unit identification data and software version identifications. With respect to the engine, for example the engine number, serial number and the like can be stored. With respect to the control unit, for example the serial number, part number, design version and CCS can be stored. With respect to the software version, for example applications, firmware and CCS can be secured.

In particular, it has proven advantageous that the electronic engine identification module which is fastened to the engine of the internal combustion engine is non-detachably firmly fastened. In particular, the engine identification module can be disconnected only by destroying a crank casing and/or a cable harness. The development has recognized that identification data are usually also available in an engine control program, but can also be falsified given suitable specialist knowledge. Owing to the non-falsifiable engine identification module it is ensured that even in the case of service intervals going back over years it is always possible to assume that correct identification of the internal combustion engine is available for software maintenance.

It has proven particularly preferred that compatibility checking on the basis of a data reconciliation with the electronic engine identification module takes place before an upload and/or download of the container structure. The upload and/or download is therefore advantageously successful to a guaranteed degree since non-compatibility is previously excluded.

In particular, it has proven advantageous that the upload and/or download of the container structure takes place in an encrypted form. This also ensures that user-side falsification or unintentional changing of maintenance software cannot take place. This ensures that even if no specialist personnel perform the maintenance in situ, incorrect interventions of an intentional or unintentional nature are nevertheless avoided.

In particular it has proven advantageous that the upload and/or download of the container structure takes place in a data-optimized protocol. This increases the efficiency of the downloads and means there is a considerable saving in time during the servicing.

Identification of all the relevant components of the internal combustion engine before software maintenance preferably takes place in an initialization phase, wherein the engine identification is read out from the engine identification module by the electronic engine control unit, and in the case of positive correspondence the normal operating mode is enabled, and in the case of negative correspondence the starting process is locked.

In particular, it has proven advantageous that the maintenance software module has: a header which can be filled with an identification data of the internal combustion engine; a container structure which can be filled with engine data of the engine and/or of the hardware component or program data; an execution program module having an automatic self-starting execution instruction is designed to execute an engine identification by means of ID data of a header of the maintenance software module and to load a container structure of the maintenance software module with engine data. The execution program module is suitable for starting the maintenance software module and the header for identifying the internal combustion engine or starting the initialization phase. Furthermore, the container structure can be filled with engine data, in particular system data, in particular system data of the engine and/or of the hardware components.

Exemplary embodiments of the invention will now be described below with reference to the drawing and in comparison with the prior art, which is also partially illustrated. The drawing is not necessarily intended to illustrate the exemplary embodiments to scale, instead, the drawing is executed in a schematic and/or slightly distorted form where this is useful for the purpose of explanation. With respect to additions to the teachings which can be directly discerned from the drawing, reference is made to the relevant prior art. In this context it is to be borne in mind that numerous modifications and changes relating to the design and the detail of an embodiment can be performed without departing from the general idea of the invention. The features of the invention which are disclosed in the description, in the drawing and in the claims can be significant for the development of the invention, either individually or else in any desired combination. In addition, the scope of the invention includes all combinations of at least two of the features disclosed in the description, the drawing and/or the claims. The general idea of the invention is not restricted to the precise design or the detail of the preferred embodiment which is presented and described below or limited to a subject matter which would be restricted compared to the subject matter claimed in the claims. In the case of specified ranges of dimensions, values lying within the specified limits are also to be considered as being disclosed as limiting values and to be capable of being used and claimed as desired. Further advantages, features and details of the invention emerge from the following description of the preferred exemplary embodiments and with reference to the drawing, in which, in particular:

DETAILED DESCRIPTION OP THE INVENTION

Figure 1:
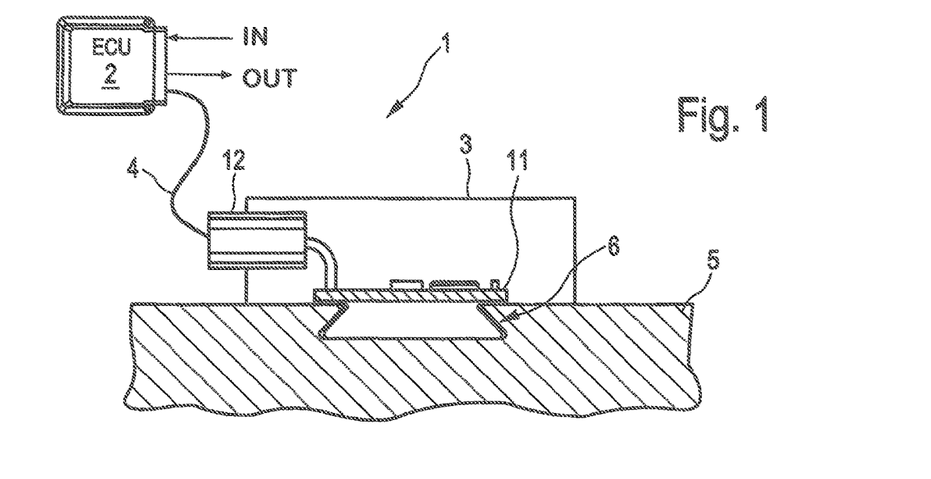
FIG. 1 shows a master-slave arrangement in a first embodiment of an internal combustion engine according to the concept of the invention.

FIG. 1 shows a master-slave arrangement in a first embodiment in which the electronic engine control unit 2 forms the master, and the engine identification module 3 forms the slave. The method for operating the internal combustion engine 100 is determined by means of the electronic engine control unit 2. The electronic engine control unit 2 includes the customary components of a microcomputer system, for example a microprocessor, 1/0 modules, buffers and memory modules (EEPROM, RAM). In the memory modules, the operating data which is relevant for the operation of the internal combustion engine 100 are applied in characteristic diagrams/characteristic curves. The electronic engine control unit 2 calculates by means of the operating data the output variables from the input variables. The input variables of a common rail system, for example the rail pressure and an engine speed nMOT, are denoted by the reference symbol ON. The output variables, for example the actuation signal for an input restrictor and an actuation signal for the injectors (start/end of injection) are identified by the reference symbol OFF. The electronic engine control unit 2 and the engine identification module 3 are connected by means of an engine cable harness 4. The data transmission takes place in encrypted form, as a result of which tapping into the data transmission at the engine cable harness is not successful. At least one microprocessor and a memory module, for example $E^2PROM$ for storing an engine identification and engine specifics are arranged in the engine identification module 3. Engine identification is to be understood as meaning the engine type, the engine part number and the serial number. Engine specifics are the individual properties of the internal combustion engine which are determined on an acceptance test bench, for example the individual properties of the installed injectors. The data are stored after the test bench run in the memory module after the belt end reconciliation. In addition, characteristic values (characteristic curves/characteristic fields) can be stored in the memory module of the engine identification module and are relevant with respect to the exhaust gas regulations, for example the state of loading of a catalytic converter or the injector wear. The engine identification module 3 is fastened to the crank casing 5 of the internal combustion engine by means of a dovetail connection 6. After the initial installation of the engine identification module 3 on the crank casing 5, the engine identification module 3 cannot be removed from the crank casing 5 without destruction. A further securing measure is that the plug 12 is cast with the engine identification module 3.

Figure 2:
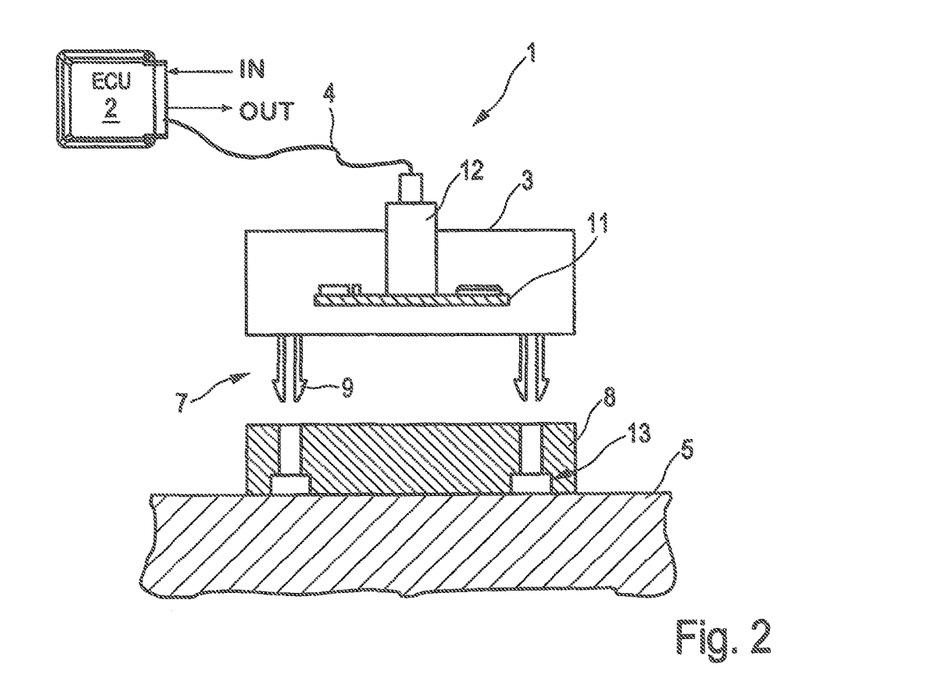
FIG. 2 shows a master-slave arrangement in a second embodiment of an internal combustion engine according to the concept of the invention.

FIG. 2 shows the master-slave arrangement 1 in a second design. In this embodiment, the identification module 3 is secured to the crank casing 5 by means of a latching connection 7, directly on the crank casing 5 or, as illustrated, by means of an intermediate panel 8. The latching connection 7 engages in a stepped cylindrical cutout 10 via latching projections 9. In this embodiment, the engine identification module 3 is also no longer able to be removed without destruction after the initial installation. An additional measure is that a conductor track of the circuit board 11 runs along the latching connection 7. An attempt at tampering in the sense of removal without permission causes this conductor track to be interrupted, as a result of which the engine identification module 3 is functionally destroyed.

In the initialization phase, the engine identification is read out from the engine identification module 3 by the electronic engine control unit 2 and cross-checked. In the case of positive correspondence, that is to say the electronic engine control unit 2 and the engine identification module 3 form a correct master-slave arrangement for this internal combustion engine, the normal operating mode is enabled. In the case of negative correspondence, the starting process is, on the other hand, locked. It is also conceivable that a specific number of starting attempts or a time limit is predefined. If, for example, after a defect the electronic engine control unit is replaced with a new one, the correct pairing of the engine control unit/internal combustion engine is ensured by means of the method. This consideration also applies to the case in which the internal combustion engine is replaced. In the case of retrofitting of the engine, the specialist personnel of the engine manufacturer adapts the engine identification module 3 via the electronic engine control unit 2. This also makes unauthorized use difficult.

After positive correspondence has been detected by the electronic engine control unit 2, the engine specifics are read out by the engine identification module 3. The engine specifics are then used in the electronic engine control unit 2 to adapt the manipulated greetings, for example for balancing the cylinders by adapting the injector-individual start of injection.

On the one hand, this advantageously makes the engine identification module 3 and the crank casing 5 impossible to disconnect by means of a dovetail connection or by means of a latching connection. Since the electronic engine control unit 2 and the engine identification module 3 are connected to one another by means of the engine cable harness 4, the plug 12 is cast to the engine identification module 3 on the side thereof. In addition, the data transmission from/to the engine control unit 2 occurs in an encrypted form. In addition to a high security level against external intervention, for example chip tuning, this concept is impressive due to its simplicity, which is evident in a low unit cost.

On the other hand, positive correspondence is provided during the initialization phase if the electronic engine control unit 2 matches the engine type. In the case of negative correspondence, the starting process is, on the other hand, locked; this relates to the starting process of the internal combustion engine and to the starting process of a maintenance process which is explained with respect to FIG. 3 and FIG. 4.

It is also conceivable that a specific number of starting attempts or a time limit are predefined. This test method is also run through after the electronic engine control unit 2 is exchanged or after the internal combustion engine 100 is exchanged. One embodiment provides that during the operation of the internal combustion engine 100 the operating data in the engine identification module 3 are updated be the electronic engine control unit 2. Operating data comprise, for example, the engine operating hours and the injector wear. Likewise, the engine identification module 3 can constitute a redundant data memory for the electronic engine control unit 2 in which the learned data values are stored.

Figures 3, 4:
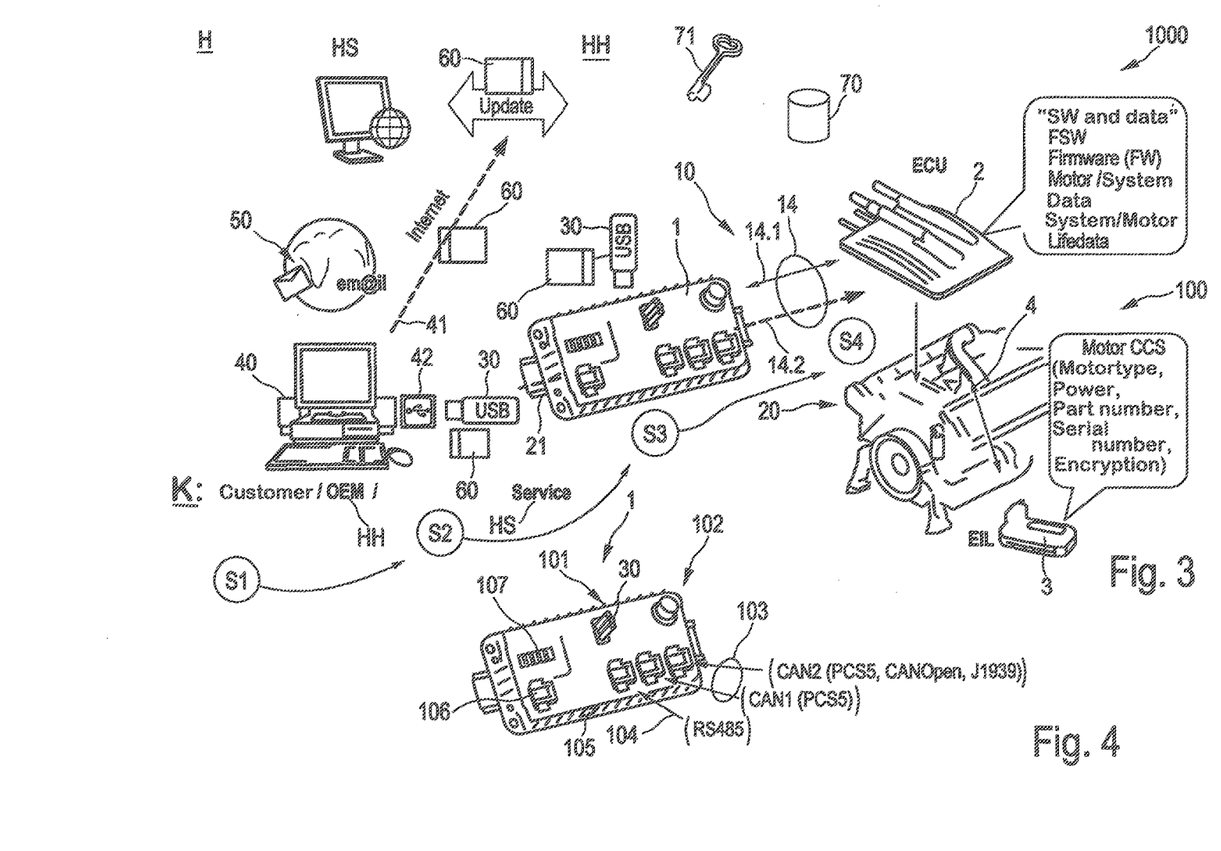
FIG. 3 shows a preferred embodiment of an internal combustion engine according to the concept of the invention within the scope of a preferred exemplary embodiment of a maintenance system.
FIG. 4 shows a preferred embodiment of a maintenance unit in an internal combustion engine for a maintenance system according to the concept of the invention as shown in FIG. 3.

FIG. 3 is a schematic view of a maintenance system 1000 for maintaining an internal combustion engine 100 which, apart from the engine 20, also has an extended hardware structure 10. The hardware structure 10 comprises here the master-slave arrangement, explained above, of an electronic engine control unit 2 (ECU) and of the engine identification module 3 (EIL) which is non-detachably firmly connected to the engine 20 and an engine cable harness 4. The electronic engine control unit 2 comprises components of firmware FW which contains the engine-specific and further system-specific engine data and system data of the internal combustion engine 100 such as operating data or the like. Furthermore, a functional engine application SFW is provided which manages the firmware and evaluates the produced engine data and system data depending on the application and reports or signals it further or feeds it back into the firmware FW. A component of the specified data is, in addition to the system-specific and engine-specific data, also service life data such as operating hours and similar data as well as individual properties of the engine 20 such as, in particular, of the injectors or similar components.

The engine identification module 3 (EIL) contains data such as the engine type, part number and serial number, but also data which characterize the operating range such as performance data or the like. Furthermore, encryption components for the encryption of the data transmission via the cable harness 4 and to further components of the extended hardware structure 10, in particular encryption components for a key 71 which serves to decrypt or encrypt data or for similarly breaking up the maintenance software module 60 which is explained below are stored in the engine identification module 3.

A further component of the hardware structure 10 forms a maintenance unit 1 which can be coupled, for example via a system cable 14.1 or via an air interface 14.2, to the electronic engine control unit 2 or to a similar data connection 14.

A non-volatile storage medium 30, which can be, for example, in the form of a memory card or the like, can be coupled to the maintenance unit 1 of the hardware structure 10 via an interface slot 101. Here, the non-volatile storage medium 30 is in the form of a USB stick or similar memory stick. The maintenance unit 1 itself can, but does not have to, be fastened to the engine 20 of the internal combustion engine 100. A detachable fixed fastening of the maintenance unit 1 to a profiled rail 21 has proven effective. For this purpose, the profiled rail can be provided on the engine 20. However, similar profiled rails 21 can also be provided in a workshop or similar maintenance center for an engine 20 in order to provide a central maintenance unit 1 by means of which different engines 20 can be maintained.

In the customer region K, which is basically also accessible to the manufacturer of the engine 20 and to a service team of the manufacturer for the engine 20, there is also a terminal 40 to which the non-volatile storage medium 30 can, as indicated in FIG. 3, be coupled; in this case by means of an interface 42 in the form of a USB interface. The terminal has not only the interface 42 but also an Internet access 41.

Here, the terminal 40 can receive a self-executable computer program product via the Internet 50, but also basically via any other connection for forming an extended network 80. An engine identification and engine data can be loaded together and exchanged by means of the computer program product, wherein the computer program product is designed to exchange, in particular upload and/or download, the abovementioned maintenance software module 60 by means of which the engine identification and the engine data can be compiled. The maintenance software module 60 is received as a packet and stored on the non-volatile storage medium 30. An engine identification is carried out by means of ID data of a header 61 of the maintenance software module 60, and a container structure 62 of the maintenance software module 60 is suitable to be loaded with engine data, wherein during the uploading the container structure 62 is filled with engine data, and during the downloading engine data are extracted from the container structure 62. The computer program product is embodied as a self-executable computer program product, wherein the execution of the computer program product takes place in an automatically self-starting fashion, and wherein the maintenance software module 60 contains an execution program module 63 which is designed to execute an engine identification by means of ID data of a header 61 of the maintenance software module 60 and is designed to load a container structure 62 of the maintenance software module 60 with engine data.

In this form, the maintenance software module 60 is made available here in a database 70 in the manufacturer region HH and is made available to the customer region K directly from the database 70 of the manufacturer or else from the service region HS of the manufacturer, in the network 80, i.e. via the Internet 50 with encryption using a key 71; specifically in that the maintenance software module 60 is downloaded in a first maintenance step S1 here as part of a self-executable computer program product by the manufacturer HH as an update and stored in a second maintenance step S2 on the USB stick. The maintenance software module 60 can be made available to the customer region K via the Internet 50; however, it can also be possible for the latter to be moved from the manufacturer region HH or the service region HS as hardware into the customer region K. In the customer region K there is a "plug-and-play" version of a maintenance software module 60 available in a third maintenance step S3 for the maintenance unit 1, for example for inputting a software update onto the engine control unit 2 or for diagnosing operating data on the engine identification module 3 or the maintenance unit 1 in a fourth maintenance step S4. The further method for maintaining the internal combustion engine 100 can run virtually fully automatically without further intervention by the manufacturer or the manufacturer service provided that the maintenance software module 60 is firstly made available, for example, on the terminal 40. In this regard, the preferred embodiment provides that the maintenance software module 60 is made available as a self-executable computer program product, and the customer transfers the maintenance software module to a non-volatile storage medium 30.

The maintenance software module 60 comprises a container structure 62 of the self-executable computer program product. If the non-volatile storage medium is coupled to the maintenance unit 1 of the hardware structure 10 in the third maintenance step S3, the computer program product itself can then be executed automatically here.

As a result the container structure 62 is uploaded or downloaded into the control unit 2 on the basis of a data reconciliation, explained with reference to FIG. 1 and FIG. 2, with the electronic engine identification module 3 following compatibility checking. The upload and/or download of the container structure 62 of the maintenance software module 60 takes place in a data-optimized protocol which is, for example, adapted for an air interface 14.1. In particular a serial interface serves here as a high-speed data communication interface 104 for a high-speed data communication between the maintenance unit 1 and the electronic engine control unit 2.

The sequence of the maintenance steps S1 to S4 can also be reversed if an upload of engine data from an engine 20 is necessary to the manufacturer region HH, this can be necessary, for example, within the scope of diagnostic maintenance or data protection. For this purpose, the non-volatile storage medium 30 can be operated, for example, as a data logger memory which continuously logs operating data or as a crash recorder memory of the maintenance software module 60. Maintenance proves advantageous in particular in the case of replacement of an engine or of a pool motor; in this case for saving analog data and operating data (upload) and transferring it into a new device (download). Both may also be necessary when a control unit is replaced in order to save software data in terms of uploading and transferring into a new device (downloading). The maintenance can also be used for diagnostics of an engine, of a control unit or of software.

Overall it is found that the handling of maintenance is possible comparatively easily—even without expert intervention by maintenance personnel—in the customer region K within the scope of a plug-and-play service. Nevertheless, maintenance proves fast, reliable and effective. Transferability to possible engines 20 of a manufacturer HH is possible, for example in the case of a centrally mounted maintenance unit 1. Furthermore, the data keeping is secured by regular feedback and the manufacturing facility HH has a good overview of the data status at the customer's premises K.

In particular, in this respect FIG. 4 shows a preferred embodiment of a maintenance unit 1. The maintenance unit 1 initially has an interface slot 101 for the non-volatile storage medium 30, here a USB interface for memory sticks. FIG. 4 shows in this respect the non-volatile storage medium in the interface slot 101. A so-called DIASYS plug serves as an engine dialog plug 102 and is provided for carrying out dialog for a service. Via the DIASYS plug 102, for example a system cable or the like can be connected to the control unit 2 of the engine 20. Further connections to the engine 20, directly and/or to the engine control unit 2, can be made via data control bus interfaces 103, here CAN 2 or CAN 1, which can couple directly to a cable harness 4 or to a CAN bus of the engine 20. In addition, a serial interface is provided as a high-speed data communication 104; a system cable 14.1 can be coupled to the latter in order to permit the high-speed data communication between the measurement unit 1 and the engine control unit 2. This is a serial interface RS485 here.

The maintenance unit also has a separate power supply 105, here a 24 volt power supply. Furthermore, the maintenance unit 1 has an operator control panel 106 which can contain, for example, a keypad or the like. Here, in particular a configuration of DIP switches is provided which serve to set a system configuration. Here a display or visual panel 107 is provided for displaying fault data or other control data obtained from the DIASYS plug connection; here in a 4 digit display for indicating faults, which is carried out in a standardized fashion with a specific code.

The data container 62 which is made available via the maintenance unit 1 of the engine control unit 2 is therefore suitable for receiving or outputting engine data or system data comprising open-loop and closed-loop control programs to the engine control unit 2 or control modules connected thereto. As a result, the operation of the engine 20 and of the entire internal combustion engine 100 as well as of the peripherals connected thereto can be maintained, i.e. repaired, updated or optimized or adapted due to ageing within the scope of a "plug-and-play" service. In particular, this can comprise mere diagnostics of data. These can be indicated essentially already via a display panel 107. In particular, checking and/or uploading of identification data can be provided by means of the engine identification module 3 for the engine control unit 2 or the engine 20 or for a software version. This concept by means of a non-volatile storage medium 30 which is embodied as a "plug-and-play" module with the maintenance software module 60 is not limited to data interrogation and updating. Instead the inputting of new characteristic diagrams or characteristic curves and control programs can also be allowed for.

LIST OF REFERENCE NUMERALS

1 Maintenance unit
2 Electronic engine control unit (ECU)
3 Engine identification module (EIL)
4 Engine cable harness
5 Crank casing
6 Dovetail connection
7 Latching connection
8 Intermediate panel
9 Latching projection
10 Hardware structure
11 Circuit board
12 Plug
13 Recess
14 Data connection 14.1 System cable
14.2 Air interface
20 Engine
21 Profiled rail
30 Hardware structure, storage medium
40 Terminal
41 Internet access
42 Interface
50 Internet
60 Maintenance software module
61 Header for engine identification
62 Container structure for engine data and/or engine programs
63 Exemplary program module
70 Database
71 Key
80 Network
100 Internal combustion engine
101 Interface slot
102 Engine dialog plug, in particular DIASYS plug for carrying out dialog for HS
103 Data control bus interface (CAN 1, CAN 2, PCS 5, CANOpen, J1939)
104 High-speed data communication interface, in particular serial interface, RS 485
105 Power supply, 24 V
106 Operator control panel, DIP switch
107 Display, 4 digit
1000 Maintenance system
FW Firmware
HH Manufacturer region
HS Service region
K Customer region
S1 First maintenance step
S2 Second maintenance step
S3 Third maintenance step
S4 Fourth maintenance step
SFW Functional engine application

The invention claimed is:

1. A method for operating an internal combustion engine having an engine, having a hardware structure including an engine control unit and a maintenance unit, having an electronic engine identification module and having an engine control program comprising firmware and a functional engine application, the method comprising the steps of:
providing a computer program product via a network by which an engine identification and engine data can be loaded together and exchanged, wherein the computer program product is operative to exchange, by uploading and/or downloading, a maintenance software module by which the engine identification and the engine data can be compiled;
transferring the computer program product to a non-volatile storage medium;
coupling the non-volatile storage medium to the maintenance unit of the hardware structure and executing the computer program product by exchanging the maintenance software module between the non-volatile storage medium and the maintenance unit; and
identifying the engine and compiling engine data by way of the maintenance software module and a hardware component of the hardware structure.

2. The method as claimed in claim 1, wherein the engine identification takes place by way of ID data of a header of the maintenance software module, and a container structure of the maintenance software module is designed to be loaded with engine data, wherein during uploading the container structure is filled with engine data, and during downloading engine data are extracted from the container structure.

3. The method as claimed in claim 1, wherein the computer program product is a self-executable computer program product, wherein execution of the computer program product takes place automatically in a self-starting fashion, and wherein the maintenance software module contains an execution program module that executes the engine identification by ways of ID data of a header of the maintenance software module and loads a container structure of the maintenance software module with engine data.

4. The method as claimed in claim 1, including compatibility checking with the electronic engine identification module based on a data reconciliation before uploading and/or downloading of the maintenance software module.

5. The method as claimed in claim 1, including uploading and/or downloading the container structure in an encrypted form.

6. The method as claimed in claim 1, including uploading and/or downloading the container structure in a data-optimized protocol.

7. The method as claimed in claim 1, further including reading out a further engine identification from the engine identification module in an initialization phase of the electronic engine control unit, and in case of positive correspondence between the further engine identification and ID data of a header of the maintenance software module data are exchanged and/or a normal operating mode of the internal combustion engine is enabled, and in case of negative correspondence a starting process of the internal combustion engine is locked.

8. A maintenance system for an internal combustion engine having an engine, comprising: a hardware structure including an engine control unit, a maintenance unit and an electronic engine identification module which is non detachably fixed to the engine, and having an engine control program;
a network for providing a self-executable computer program product by which an engine identification and engine data are loaded together and exchanged, the network being designed to exchange a maintenance software module by which the engine identification and the engine data are compiled;
a non-volatile storage medium designed to transfer the self-executable computer program product, wherein the maintenance unit is operative to couple the non-volatile storage medium to the maintenance unit and execute the computer program product by exchanging the maintenance software module between the non-volatile storage medium and the maintenance unit, and wherein identification of the engine and compilation, of engine data are made possible by the maintenance software module and a hardware component of the hardware structure.

9. The maintenance system as claimed in claim 8, wherein the computer program product is executable by uploading and/or downloading a maintenance software module, with ID data in a header and engine data in a container structure between the non-volatile storage medium and a hardware component in the hardware structure.

* * * * *